Jan. 7, 1930. A. G. SCHUMANN 1,742,938
PROPELLER FOR AIRCRAFT
Filed Sept. 22, 1927
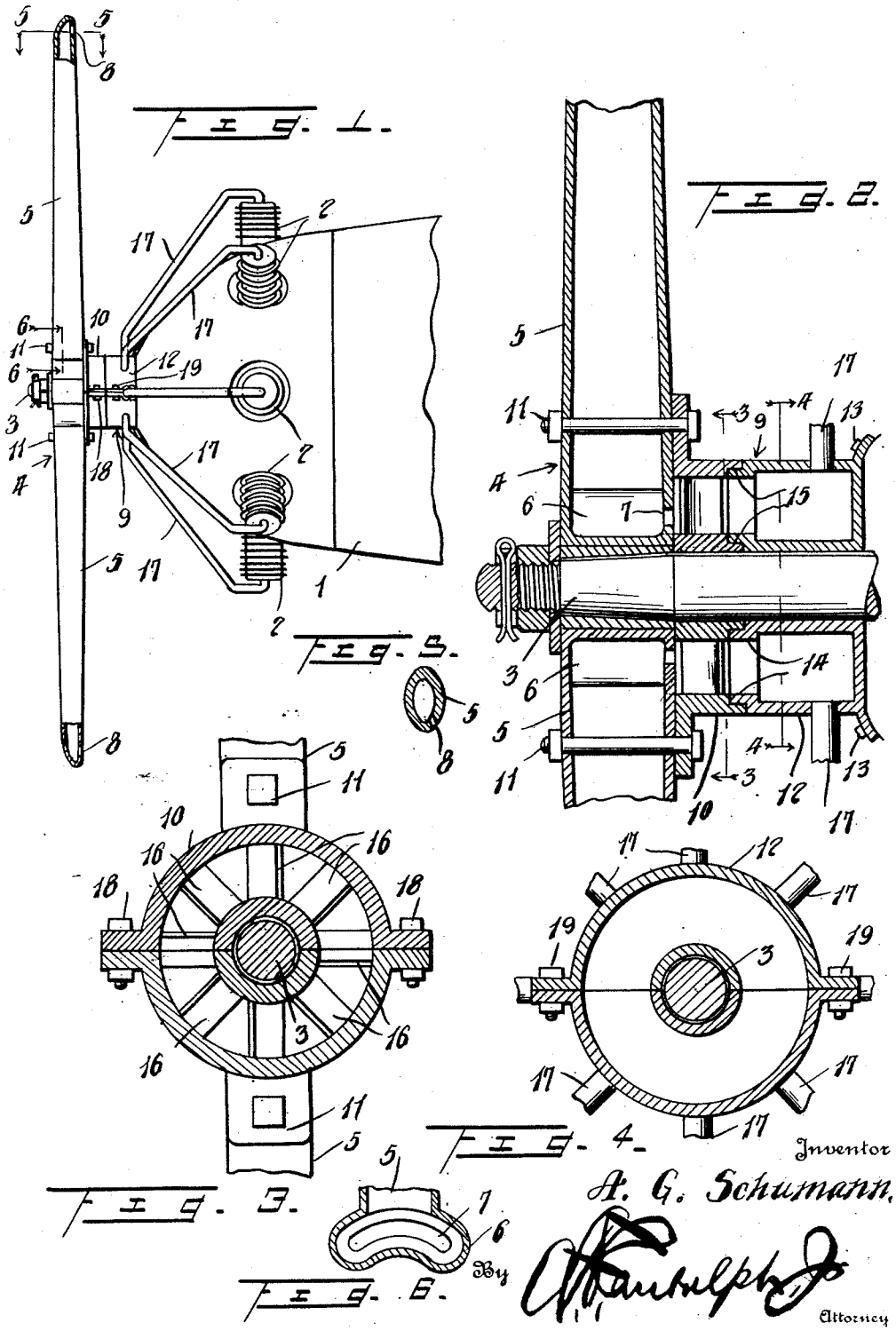

Patented Jan. 7, 1930

1,742,938

UNITED STATES PATENT OFFICE

ALFRED G. SCHUMANN, OF BALTIMORE, MARYLAND

PROPELLER FOR AIRCRAFT

Application filed September 22, 1927. Serial No. 221,360.

This invention relates to propellers for aircrafts, and has for one of its objects to provide a propeller of this character wherein the blades shall be hollow and provided at their inner ends with intake ports and at their outer ends with discharge ports, whereby to permit them to be heated by the exhaust gases from the engine of the aircraft for the purpose of reducing to the minimum the resistance offered by the air to the rotation of the propeller and for the purpose of preventing the formation of ice on the propeller.

A further object of the invention is to provide a propeller of the character stated wherein the exhaust gases shall be directed into and discharged from its blades in a manner to prevent the formation of any back pressure in the engine and to reduce to the minimum the noise incident to the discharge of the exhaust gases into the atmosphere.

With the foregoing and other objects in view, the nature of which will appear as the description proceeds, the invention consists of the novel construction, combination and arrangement of parts hereinafter fully described and claimed, and illustrated in the accompanying drawing, wherein:

Figure 1 is an elevational view of a fragmentary portion of an aircraft equipped with a propeller embodying my invention, the outer ends or tips of the propeller being in longitudinal section, Figure 2 is a sectional view on an enlarged scale taken on a plane extending longitudinally through the central portion of the propeller, Figure 3 is a sectional view taken on the plane indicated by the line 3—3 of Figure 2, Figure 4 is a sectional view taken on the plane indicated by the line 4—4 of Figure 2, Figure 5 is a sectional view taken on the plane indicated by the line 5—5 of Figure 1, and Figure 6 is a sectional view taken on the plane indicated by the line 6—6 of Figure 1.

Referring in detail to the drawing, 1 designates the forward portion of the body of an aircraft, and 2 designates the cylinders and 3 the propeller shaft of the engine of the aircraft.

The propeller 4 of the aircraft is secured to the shaft 3 in the usual manner, and its blades 5 are hollow and provided with substantially semi-circular inner ends 6. The blades 5 are provided with intake ports 7 which are located in the rear sides of their inner ends 6, and they are provided with exhaust ports 8 which are located in their rear sides adjacent the outer ends and trailing edges. An annular manifold 9 which surrounds the shaft 3 and is located between the body 1 and propeller 4, consists of a movable section 10 secured to the propeller by bolts 11 and a fixed section 12 secured to the body by bolts 13. The manifold section 10 is fully open at its front and rear sides, and its front side registers with the intake ports 7 and its rear side with the open front side of the manifold section 12. A gas-tight connection is established between the manifold sections 10 and 12 by annular flanges 14 carried by the front side of the section 12 and fitting in annular recesses 15 formed in the rear side of the section 10. Impeller blades 16 are secured within the manifold section 10, and the pitch thereof is similar to that of the propeller blades 5. Pipes 17 extend from the exhaust ports of the cylinders 2 to the manifold section 12. The manifold sections 10 and 12 are each made in two parts to permit them to be readily applied or removed without first removing the propeller 4 from the shaft 3, and the parts of the manifold sections are secured together by bolts 18 and 19.

From the foregoing and accompanying drawing, it will be apparent that the exhaust gases from the engine will pass through the propeller, and that the consequent heating of the propeller will reduce to the minimum the resistance offered by the air to its rotation and will prevent it from being coated with ice. The inner walls of the propeller blades 5 are curved as shown in Figure 5 in order to permit the free passage of the exhaust gases therethrough. As the exhaust ports 8 are located in the rear sides of the propeller blades 5 and adjacent the outer ends and trailing edges, and due to the provision of the movable manifold section 10 with the impeller blades 16, the exhaust gases will be drawn and forced through the propeller blades under sufficient pressure to prevent the formation of any back pressure in the engine. As the gases are carried through the manifold 9 and propeller blades 5 before being discharged into the atmosphere, the discharge of the exhaust into the atmosphere will be accompanied with comparatively little noise.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

1. In combination, a propeller provided with hollow blades having intake and discharge ports, a manifold section secured to the propeller and communicating with the intake ports thereof, a manifold section having a fixed position with respect to and communicating with said first manifold section, an engine for rotating the propeller, means for conveying the exhaust from the engine to the fixed manifold section, and impeller blades arranged within said first manifold section to be impinged against by the exhaust in its travel from the fixed manifold section.

2. In combination, a propeller provided with hollow blades having intake ports adjacent the hub and discharge ports outwardly thereof, a manifold section, means clamping said section to the propeller without said intake ports, a manifold section in overlapped relation with the first mentioned manifold section having a fixed position with respect to the first manifold section, in combination with an engine for rotating the propeller, said sections having hub portions through which said shaft passes, impeller blades arranged within the first manifold section, and means for conveying exhaust from the engine to the first manifold section to act on said impeller blades and then enter said intake ports to pass through the propeller blades.

In testimony whereof I affix my signature.

ALFRED G. SCHUMANN.